Figure 3:
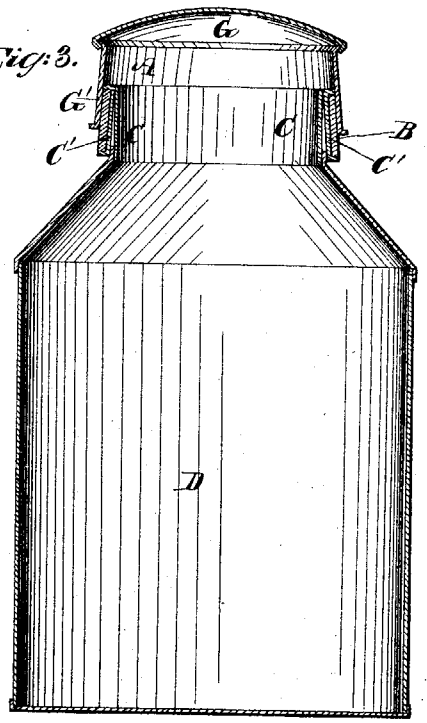
Figure 2:
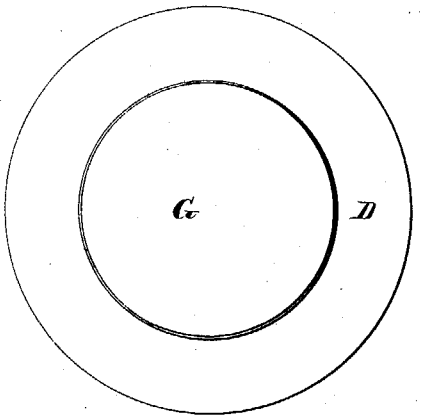

W. H. LYMAN.

Sealing Fruit Jars.

No. 2,463. Reissued Jan'y 22, 1867.

Witnesses:
Hicks
Platt

Inventor:
Elbridge Harris
By his assignee
William H. Lyman

N. PETERS, Photo-Lithographer, Washington, D. C

UNITED STATES PATENT OFFICE.

WILLIAM W. LYMAN, OF WEST MERIDEN, CONN., ASSIGNEE, BY MESNE ASSIGNMENTS, OF ELBRIDGE HARRIS, OF BOSTON, MASS.

IMPROVEMENT IN SEALING FRUIT-JARS.

Specification forming part of Letters Patent No. 41,575, dated February 9, 1864; Reissue No. 2,463, dated January 22, 1867.

*To all whom it may concern:*

Be it known that ELBRIDGE HARRIS, of Boston, county of Suffolk, and State of Massachusetts, invented a certain new and useful Improvement in Fruit-Cans; and to enable others skilled in the art to make and use the same, I will proceed to describe, referring to the drawings, in which the same letters indicate like parts in each of the figures.

Figure 1:
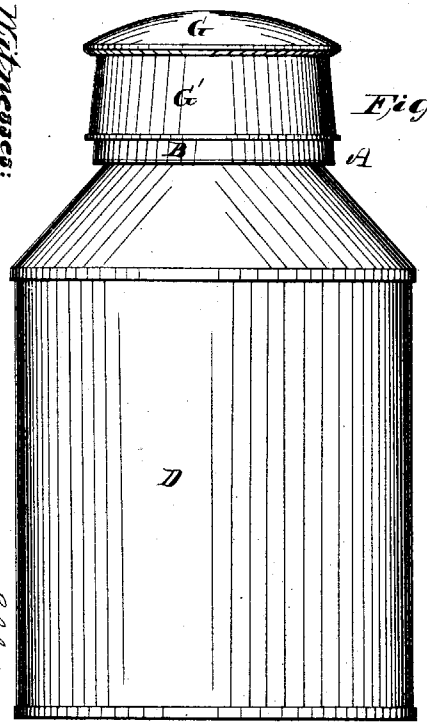

Figure 1 is a side elevation. Fig. 3 represents a vertical transverse section of a fruit-can constructed according to my invention.

The nature of this invention consists in fitting the can or jar with a rim-cover of a proper size relative to the neck thereof, to admit between the neck of the can or jar and the rim of the cover an elastic band of sufficient thickness to render the jar impervious to air when said cover is firmly compressed thereon.

The invention consists, further, of the combination of the preceding parts of the invention with a flange, for the purpose of keeping the elastic packing-ring in its place while the cover is depressed onto the neck of the can or jar.

The invention consists, further, of the combination of a rim-cover with a flange located on the neck of the jar or can, beneath the elastic packing-ring, so that when the cover is removed the elastic packing-ring is withdrawn with it.

The body D of the can or jar is provided with a neck, C, and rabbet C′, the object of which is to receive and hold the elastic ring or band B in place, so as to closely pack the space between the neck C of the receptacle and the rim G′ of its cap G, and so that when the cap is removed the elastic band or ring will be removed therewith.

A is a band of metal or other material, either made on or secured to the neck of a can or jar, having one or more projecting lips, *a*, which lips form what may be called a "rabbet," "groove," or "depression," specially designed to receive or form a seat for the elastic ring or band B, which is made of any suitable material which shall possess proper amount of elasticity and be impervious to air.

It will be readily perceived that the rabbet C′, groove or depression C, for the reception of the elastic band or ring B, can be easily formed in the neck of a jar or can itself, when made of glass or other metals which are formed in molds, by simply making the said molds of proper or required form or shape.

G is the top of the cover. G′ is the rim of the cover. This cover may be made whole in one piece, either by casting or forming in a moldor die, and of any suitable material and by any of the well-known processes.

B is the elastic ring or band, made of any suitable elastic material which is impervious to air, which ring or band is sprung over onto the rabbet or into the groove or depression formed on or in the neck of a can, the cover or rim G′ of the cover being made also slightly tapering upon its inner surface for the purpose of insuring an intimate contact of its surface with or upon and around that of the elastic band B.

This invention is designed to furnish a cheap, simple, and effectual mode of closing fruit-jars, &c., impervious to air, and which shall, in addition thereto, present the advantage of great simplicity and ease of application.

The mode of using this improvement seems to be so self-evident as to render an explanation unnecessary. I believe I have thus described the nature and construction of my improvement so as to enable a person skilled to make and use the same.

What I claim, therefore, and desire to secure by Letters Patent, is—

1. Forming a groove or depression in or around the neck of a can for the retention of an elastic ring or band impervious to air, substantially as and for the purpose described.

2. The employment of an elastic ring or band, when used between the rim of a cover and the neck of a can, substantially as and for the purpose described.

3. As a new article of manufacture, fruit-jars composed of the rim-cap G G′, elastic ring or band B, and jar or can D, substantially as and for the purpose described.

4. The rabbet formation C′, in combination with the elastic band B and the flange G′, substantially as and for the purpose described.

WILLIAM W. LYMAN.

Witnesses:
RATCLIFFE HICKS,
ORVILLE H. PLATT.